March 28, 1939. K. JONES 2,152,548
SEED GATHERING ATTACHMENT FOR MOWING MACHINES
Filed June 1, 1937 4 Sheets-Sheet 4
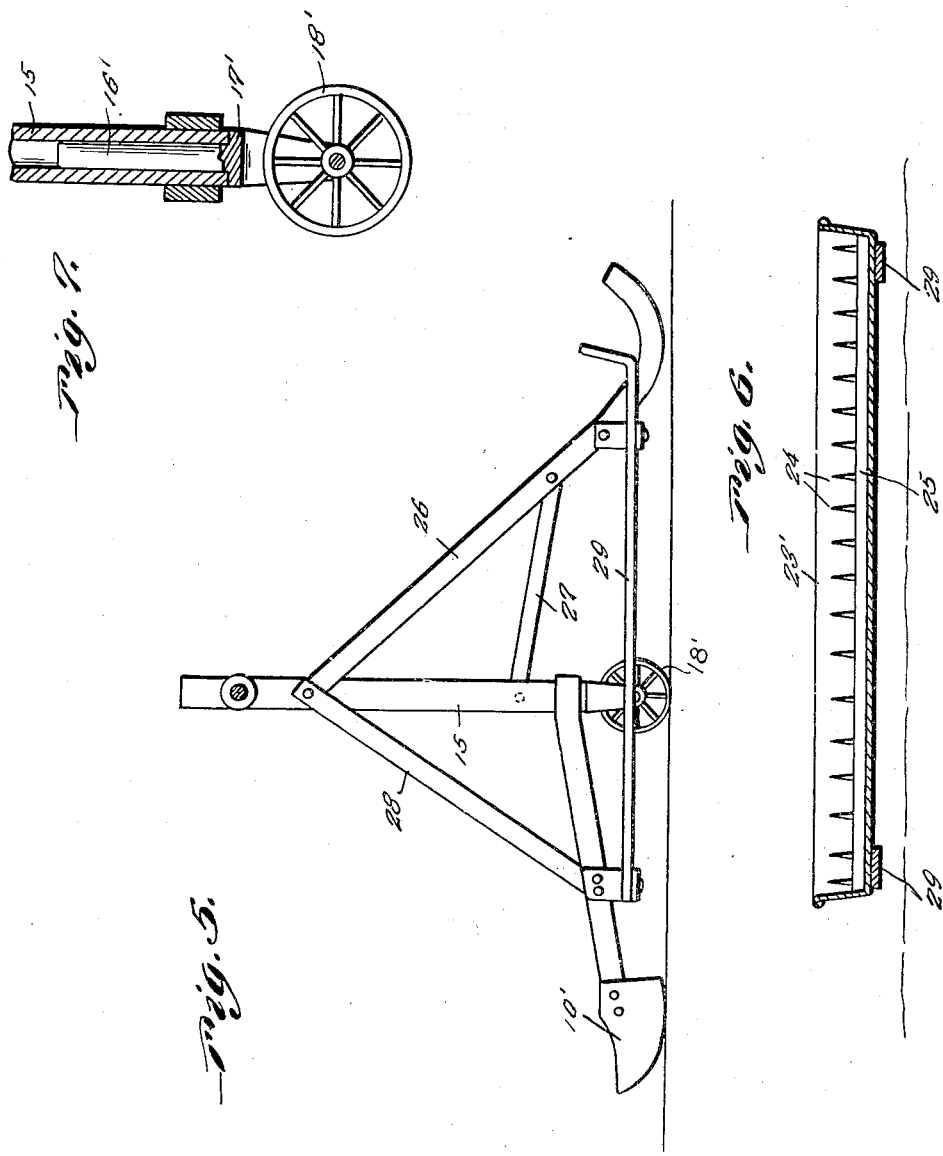

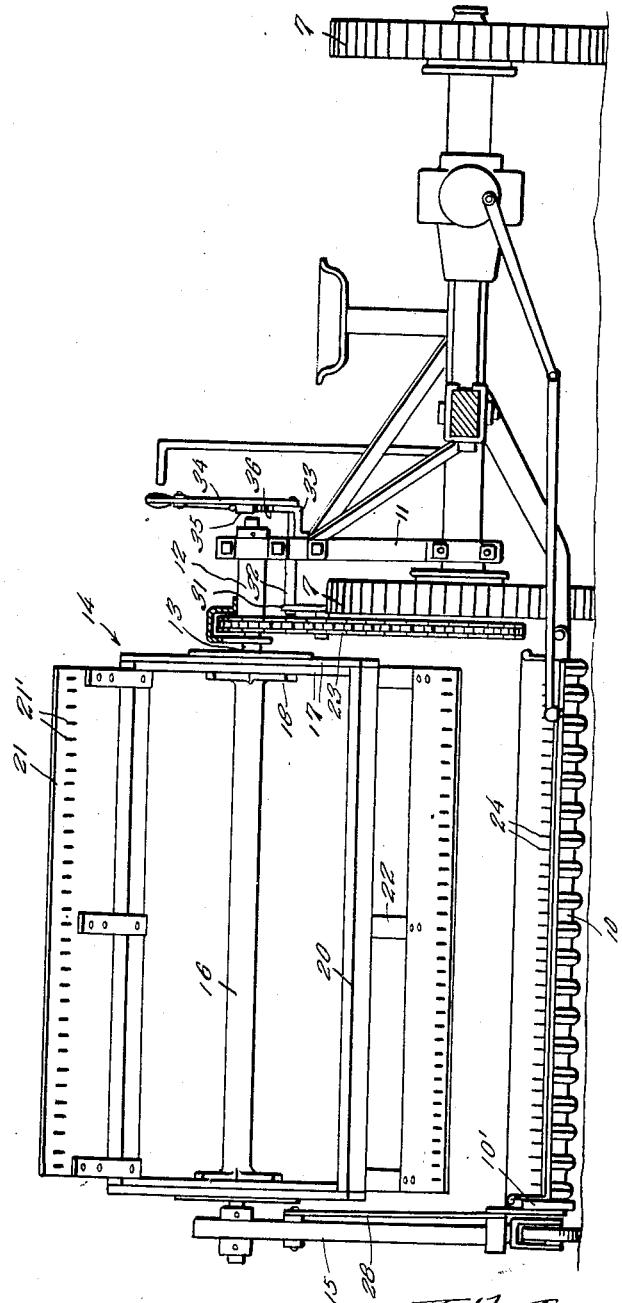

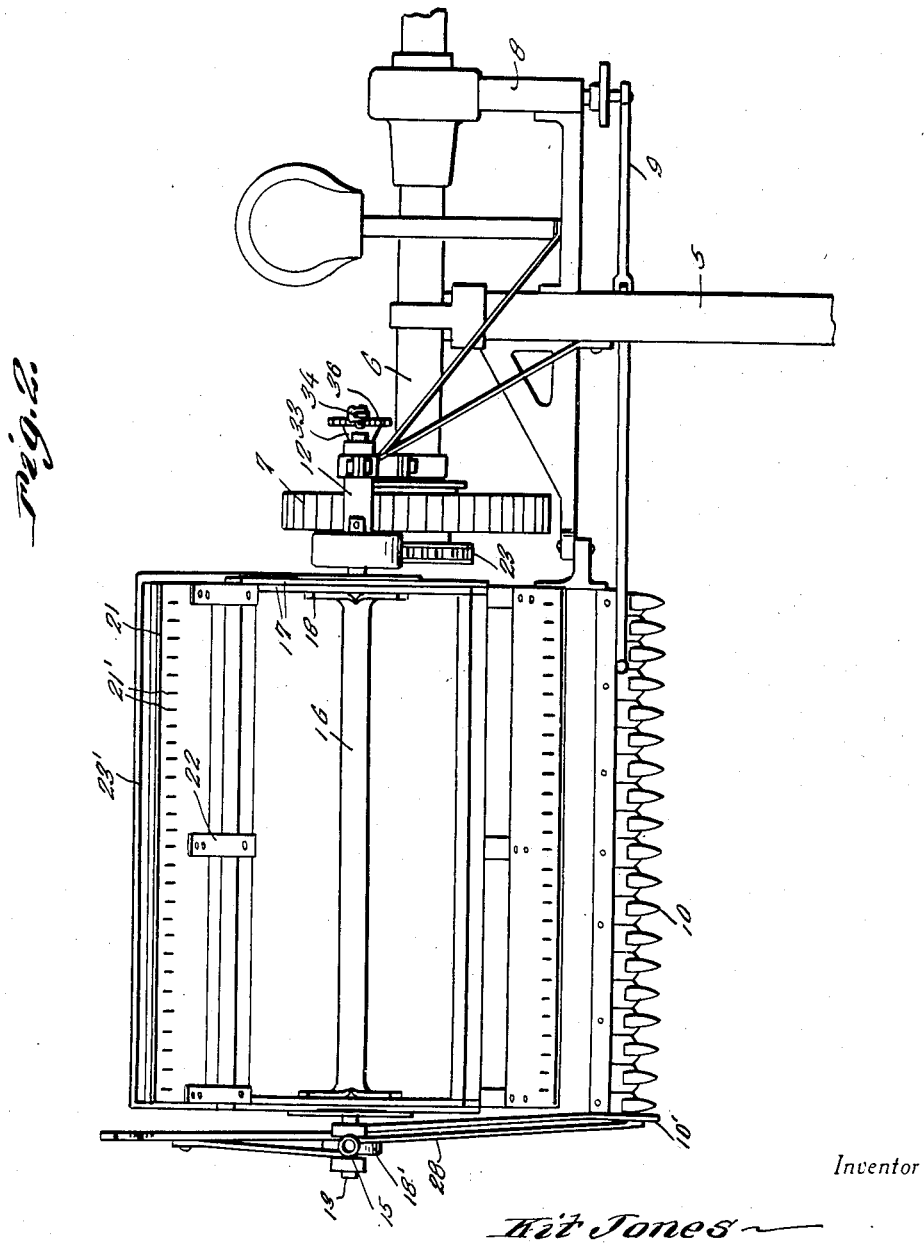

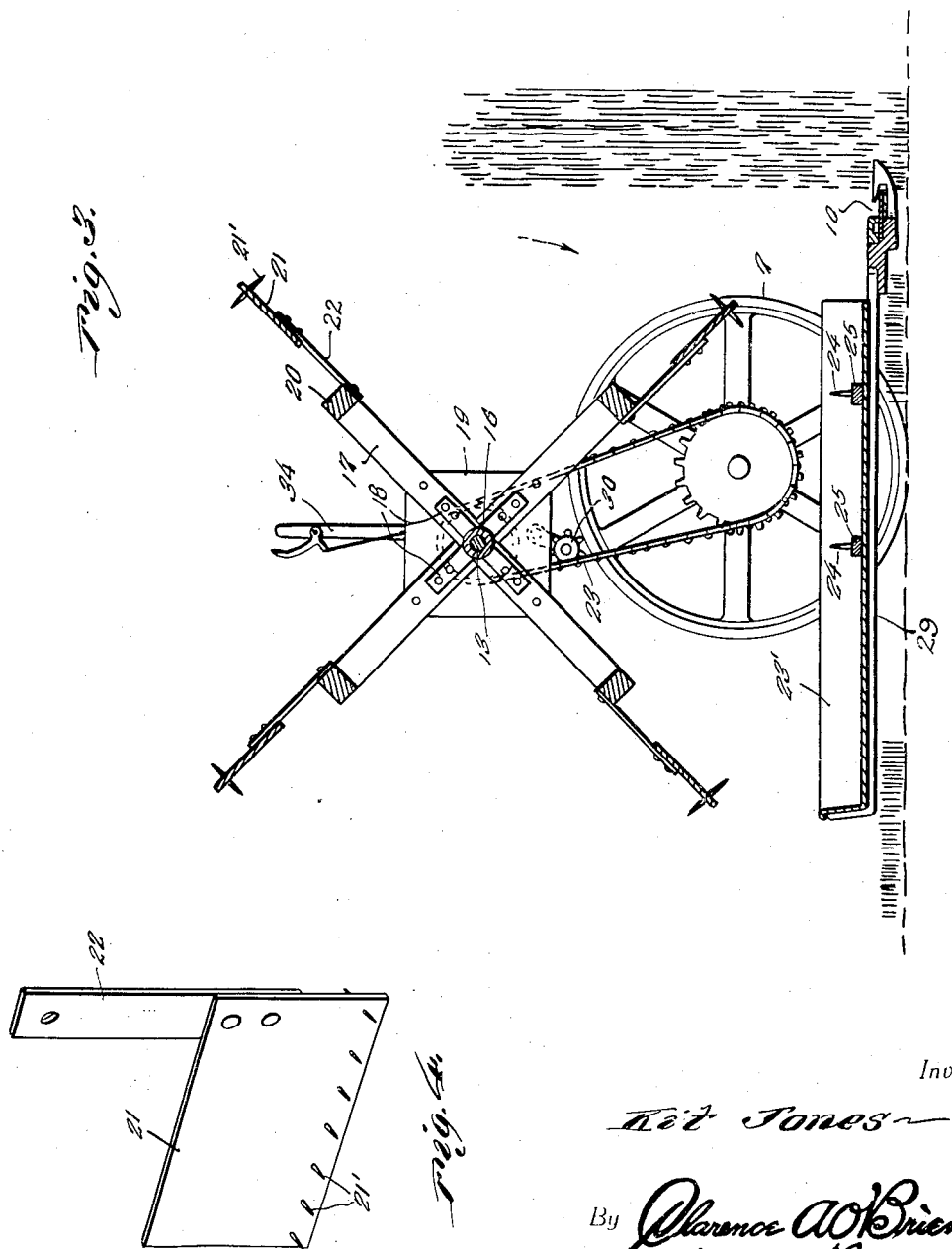

Patented Mar. 28, 1939

2,152,548

UNITED STATES PATENT OFFICE 2,152,548

SEED GATHERING ATTACHMENT FOR MOWING MACHINES

Kit Jones, Woodlawn, Tenn.

Application June 1, 1937, Serial No. 145,900

1 Claim. (Cl. 56—207)

This invention relates to mowing machines and particularly to mowing machines designed for the purpose of cutting grass or clover, the object of the invention being to simultaneously cut the grass or clover and separate or thrash and beat out the seed.

The invention, together with its objects and advantages will be best understood from a study of the following description, taken in connection with the accompanying drawings, wherein:

Figure 1 is a front elevational view of the improved seed gathering reel attachment applied to a mowing machine.

Figure 2 is a top plan view thereof.

Figure 3 is a sectional view through the seed gathering reel attachment.

Figure 4 is a fragmentary perspective view of one of the blades forming part of the reel.

Figure 5 is an end elevational view of the attachment with certain parts shown in section.

Figure 6 is a sectional view through the seed pan.

Figure 7 is a detail view showing a supporting wheel for the seed pan.

Referring to the drawings, it will be seen that I have illustrated a mowing machine of a more or less conventional type having the usual tongue 5, the supporting frame designated generally at 6, the traction wheels 7 from which power is derived to operate the cutter bar, the shaft housing 8 having the usual crank operating the cutter bar, and a pitman 9, this pitman in turn acting upon the cutter bar 10, mounted upon the usual cutter bar guide.

In accordance with the present invention, there is suitably mounted on the frame 6 of the mower a standard 11 provided at its upper end with a bearing 12 in which is journalled one end of a shaft 13 on which is mounted a reel indicated generally by the reference numeral 14. The other end of the shaft 13 is suitably journalled in the upper end of a standard 15, the lower end of which, as shown in Figure 7 is hollow to provide a socket for the shank 16 of a yoke 17'. Journalled between the arms of the fork of yoke 17' is a supporting wheel 18'.

The reel 14 comprises an elongated tubular hub member 16 mounted on the shaft 13 and suitably secured thereto to turn therewith. At the respective opposite ends thereof, hub 16 is provided with spokes 17 secured at one end to the ends of the hub 16 through the medium of complemental fingers 18 and plates 19.

The spokes 17 are connected at their outer ends in pairs through the medium of cleats 20.

Carried by each cleat 20 is a blade 21 of oblong plate-like form, and each plate 21 is secured to its cleat 20 through the medium of metallic bars or straps 22 riveted at one end to the plate 21 and bolted or otherwise secured at its opposite end to a cleat 20.

Adjacent the free end edge thereof, each blade or plate 21 has extending therethrough raker teeth 21' in the form of relatively short rods sharpened at both ends to points as clearly shown in Figures 3 and 4.

For revolving the reel, shaft 13 is driven from the axle of the mower wheels 7 through the medium of a chain and sprocket driving connection 23, as shown.

The spikes 21' will serve, in actual practice, to sweep the cut grass or hay toward the rear of a seed pan 23' and cooperate with upstanding pointed teeth 24 arranged in series on cleats 25 extending from one end to the other end of the pan 23' and suitably secured to the bottom of the pan.

The pan 23' is supported rearwardly of, and moves over the ground or grass rearward of the cutter bar 10, as shown. Thus, it will be seen that the reel 14, in its movement, strikes the cut grass detaching the seed therefrom, which falls into the pan, and the reel carries the grass upward and over the pan and distributes it behind the pan and thus the hay is thrashed and cut at the same time.

To maintain the reel 14 in balance when crossing rough or high places, I provide what may be termed a balance rod 26 that is secured at its upper end to the post 15 and intermediate its ends is braced relative to the post through the medium of a brace member 27.

Also, the post 15 is braced from the cutter bar 10 through the medium of a brace rod 28. Extending rearwardly from the cutter bar 10 are supporting straps 29 upon which rests the pan 23'.

For taking up or permitting slack in the sprocket chain 23 there is provided a toothed idler pinion 30 suitably mounted on the end of an arm 31 provided on shaft 32. Shaft 32 is suitably journaled in the bearing standard 11 and in a bracket 33 mounted on one side of the standard 11. On the free end of the shaft 32 is a lever 34 equipped with a detent 35 cooperable with a rack segment 36 provided on the bracket 33 for securing the shaft 32 at the desired position of rotative adjustment and with the toothed pinion 30 engaged with the chain 23 in a manner found desirable for increasing or taking up slack in the chain.

It will be seen that this device is particularly adapted for saving seed, and further that the attachment is simply made, may be readily applied to ordinary mowing machines, and is extremely effective for the purpose intended.

Having thus described the invention, what is claimed as new is:

A seed gathering attachment for a mowing machine which includes a supporting frame and a laterally extending cutter bar, comprising a standard, means for connecting the lower end of the standard to a part of the supporting frame, a second standard, said standards having bearing at their upper ends, a shaft journaled in said bearings, a reel carried by the shaft, means for rotating the shaft from one of the ground wheels of the mowing machine, the second standard having a vertically arranged socket in its lower end, a vertically arranged stub-shaft rotatably arranged in the socket and having a forked lower end extending from the socket, a ground engaging wheel carried by the forked part, straps secured to and extending rearwardly from the cutter bar, a pan supported by said straps, spaced bars contacting the upper face of the bottom of the pan and extending parallel to the cutter bar, upwardly extending pins carried by the bars, a downwardly and rearwardly extending bar having its upper end connected with an upper portion of the second standard with the lower end of said last-mentioned bar being of arcuate shape with its convexed edge lowermost and said arcuate end of the bar being located below the plane of the bottom of the pan, a brace connecting an intermediate part of said last-mentioned bar with a lower part of the second standard.

KIT JONES.